(12) United States Patent
Denton et al.

(10) Patent No.: US 11,110,388 B2
(45) Date of Patent: Sep. 7, 2021

(54) APPARATUS AND SYSTEM FOR SWING ADSORPTION PROCESSES RELATED THERETO

(71) Applicant: ExxonMobil Upstream Research Company, Spring, TX (US)

(72) Inventors: Robert D. Denton, Bellaire, TX (US); Ananda K. Nagavarapu, Houston, TX (US); Bruce T. Kelley, Porter, TX (US); Robert A. Johnson, Doylestown, PA (US); Bennett D. Marshall, Conroe, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 215 days.

(21) Appl. No.: 16/548,995

(22) Filed: Aug. 23, 2019

(65) Prior Publication Data

US 2019/0381447 A1 Dec. 19, 2019

Related U.S. Application Data

(62) Division of application No. 15/670,768, filed on Aug. 7, 2017, now Pat. No. 10,434,458.

(Continued)

(51) Int. Cl.
 *B01D 53/047* (2006.01)
 *B01D 53/04* (2006.01)
 (Continued)

(52) U.S. Cl.
 CPC ......... *B01D 53/0473* (2013.01); *B01D 15/08* (2013.01); *B01D 15/161* (2013.01);
 (Continued)

(58) Field of Classification Search
 CPC .............. B01D 53/0473; B01D 15/163; B01D 15/161; B01D 15/08; B01D 15/1821;
 (Continued)

(56) References Cited

U.S. PATENT DOCUMENTS 1,868,138 A 7/1932 Fisk
3,103,425 A 9/1963 Meyer
(Continued)

FOREIGN PATENT DOCUMENTS

EP 0257493 2/1988
EP 0426937 5/1991
(Continued)

OTHER PUBLICATIONS

U.S. Appl. No. 16/252,975, filed Jan. 21, 2019, Krishna Nagavarapu et al.
(Continued)

*Primary Examiner* — Thuan D Dang
(74) *Attorney, Agent, or Firm* — ExxonMobil Upstream Research Company—Law Department (57) ABSTRACT

Provided are apparatus and systems for performing a swing adsorption process. This swing adsorption process may involve passing an input feed stream through two swing adsorption systems as a purge stream to remove contaminants, such as water, from the respective adsorbent bed units. The wet purge product stream is passed to a solvent based gas treating system, which forms a wet hydrocarbon rich stream and a wet acid gas stream. Then, the wet hydrocarbon rich stream and the wet acid gas stream are passed through one of the respective swing adsorption systems to remove some of the moisture from the respective wet streams.

19 Claims, 3 Drawing Sheets

Related U.S. Application Data (60) Provisional application No. 62/381,838, filed on Aug. 31, 2016.

(51) Int. Cl.
| | |
|---|---|
| *B01D 53/14* | (2006.01) |
| *B01D 53/18* | (2006.01) |
| *B01D 53/26* | (2006.01) |
| *C10L 3/10* | (2006.01) |
| *B01D 15/18* | (2006.01) |
| *B01D 15/08* | (2006.01) |
| *B01D 15/16* | (2006.01) |

(52) U.S. Cl.
CPC ....... *B01D 15/163* (2013.01); *B01D 15/1821* (2013.01); *B01D 53/0462* (2013.01); *B01D 53/0476* (2013.01); *B01D 53/1437* (2013.01); *B01D 53/1462* (2013.01); *B01D 53/18* (2013.01); *B01D 53/261* (2013.01); *C10L 3/103* (2013.01); *C10L 3/104* (2013.01); *B01D 2252/204* (2013.01); *B01D 2253/104* (2013.01); *B01D 2253/108* (2013.01); *B01D 2253/116* (2013.01); *B01D 2253/204* (2013.01); *B01D 2256/00* (2013.01); *B01D 2256/22* (2013.01); *B01D 2256/24* (2013.01); *B01D 2257/304* (2013.01); *B01D 2257/504* (2013.01); *B01D 2257/80* (2013.01); *B01D 2259/40054* (2013.01); *B01D 2259/40081* (2013.01); *C10L 2290/542* (2013.01); *C10L 2290/543* (2013.01)

(58) Field of Classification Search
CPC ............ B01D 53/0476; B01D 53/0462; B01D 53/1437; B01D 53/18; B01D 53/1462; B01D 53/261; B01D 2253/104; B01D 2253/108; B01D 2253/116; B01D 2253/204; B01D 2256/00; B01D 2256/22; B01D 2259/40054; B01D 2256/24; B01D 2257/80; B01D 2252/204; B01D 2257/304; B01D 2257/504; B01D 2259/40081; C10L 3/103; C10L 3/104; C10L 2290/543; C10L 2290/542
See application file for complete search history.

(56) References Cited

U.S. PATENT DOCUMENTS

| | | |
|---|---|---|
| 3,124,152 A | 3/1964 | Payne |
| 3,142,547 A | 7/1964 | Marsh et al. |
| 3,508,758 A | 4/1970 | Strub |
| 3,594,983 A | 7/1971 | Yearout |
| 3,602,247 A | 8/1971 | Bunn et al. |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher, Jr. |
| 4,340,398 A | 7/1982 | Doshi et al. |
| 4,386,947 A | 6/1983 | Mizuno et al. |
| 4,421,531 A | 12/1983 | Dalton, Jr. et al. |
| 4,445,441 A | 5/1984 | Tanca |
| 4,461,630 A | 7/1984 | Cassidy et al. |
| 4,496,376 A | 1/1985 | Hradek |
| 4,631,073 A | 12/1986 | Null et al. |
| 4,693,730 A | 9/1987 | Miller et al. |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |
| 4,790,272 A | 12/1988 | Woolenweber |
| 4,814,146 A | 3/1989 | Brand et al. |
| 4,816,039 A | 3/1989 | Krishnamurthy et al. |
| 4,877,429 A | 10/1989 | Hunter |
| 4,977,745 A | 12/1990 | Heichberger |
| 5,110,328 A | 5/1992 | Yokota et al. |
| 5,125,934 A | 6/1992 | Krishnamurthy et al. |
| 5,169,006 A | 12/1992 | Stelzer |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,354,346 A | 10/1994 | Kumar |
| 5,365,011 A | 11/1994 | Ramachandran et al. |
| 5,370,728 A | 12/1994 | Lasala et al. |
| 5,486,227 A | 1/1996 | Kumar et al. |
| 5,547,641 A | 8/1996 | Smith et al. |
| 5,565,018 A | 10/1996 | Baksh et al. |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,779,768 A | 7/1998 | Anand et al. |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,882,380 A | 3/1999 | Sircar |
| 5,906,673 A | 5/1999 | Reinhold, III et al. |
| 5,912,426 A | 6/1999 | Smolarek et al. |
| 5,914,294 A | 6/1999 | Park et al. |
| 5,924,307 A | 7/1999 | Nenov |
| 5,935,444 A | 8/1999 | Johnson et al. |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg et al. |
| 6,099,621 A | 8/2000 | Ho |
| 6,102,985 A | 8/2000 | Naheiri et al. |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,444,610 B1 | 9/2002 | Yamamoto |
| 6,451,095 B1 | 9/2002 | Keefer et al. |
| 6,457,485 B2 | 10/2002 | Hill et al. |
| 6,458,187 B1 | 10/2002 | Fritz et al. |

(56) References Cited

U.S. PATENT DOCUMENTS

| | | |
|---|---|---|
| 6,464,761 B1 | 10/2002 | Bugli |
| 6,471,749 B1 | 10/2002 | Kawai et al. |
| 6,471,939 B1 | 10/2002 | Boix et al. |
| 6,488,747 B1 | 12/2002 | Keefer et al. |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez-Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Connor et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,243,679 B2 | 7/2007 | Thelen |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | Labuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Keefer et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | Labuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,449,649 B2 | 5/2013 | Greenough |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |

(56) References Cited

U.S. PATENT DOCUMENTS

| | | |
|---|---|---|
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |
| 8,715,617 B2 | 5/2014 | Genkin et al. |
| 8,752,390 B2 | 6/2014 | Wright et al. |
| 8,753,428 B2 | 6/2014 | Lomax, Jr. et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |
| 8,790,618 B2 | 7/2014 | Adams et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,939,014 B2 | 1/2015 | Kamakoti et al. |
| 9,005,561 B2 | 4/2015 | Leta et al. |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,067,169 B2 | 6/2015 | Patel |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,483 B2 | 10/2015 | Ravikovitch et al. |
| 9,168,485 B2 | 10/2015 | Deckman et al. |
| 9,272,264 B2 | 3/2016 | Coupland |
| 9,278,338 B2 | 3/2016 | Coupland |
| 9,358,493 B2 | 6/2016 | Tammera et al. |
| 9,573,116 B2 | 2/2017 | Johnson et al. |
| 9,597,655 B2 | 3/2017 | Beeckman et al. |
| 9,737,846 B2 | 8/2017 | Carstensen et al. |
| 9,744,521 B2 | 8/2017 | Brody et al. |
| 10,040,022 B2 | 8/2018 | Fowler et al. |
| 10,080,991 B2 | 9/2018 | Johnson et al. |
| 10,080,992 B2 | 9/2018 | Nagavarapu et al. |
| 10,124,286 B2 | 11/2018 | McMahon et al. |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret et al. |
| 2003/0170527 A1 | 9/2003 | Finn et al. |
| 2003/0188635 A1 | 10/2003 | Lomax, Jr. et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim et al. |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0014511 A1 | 1/2005 | Spain |
| 2005/0045041 A1 | 3/2005 | Hechinger et al. |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0116430 A1 | 6/2006 | Wentink et al. |
| 2006/0116460 A1 | 6/2006 | Georget et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0006732 A1* | 1/2007 | Mitariten ........... B01D 53/0462 95/237 |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0202336 A1 | 8/2008 | Hofer et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |

(56) References Cited

U.S. PATENT DOCUMENTS

| | | |
|---|---|---|
| 2012/0024150 A1 | 2/2012 | Moniot |
| 2012/0024152 A1 | 2/2012 | Yamawaki et al. |
| 2012/0031144 A1 | 2/2012 | Northrop et al. |
| 2012/0067216 A1 | 3/2012 | Corma Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0272823 A1 | 11/2012 | Halder et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0095996 A1 | 4/2013 | Buelow et al. |
| 2013/0225898 A1 | 8/2013 | Sundaram et al. |
| 2014/0013955 A1 | 1/2014 | Tammera et al. |
| 2014/0060326 A1 | 3/2014 | Sundaram |
| 2014/0157984 A1 | 6/2014 | Deckman et al. |
| 2014/0157986 A1 | 6/2014 | Ravikovitch et al. |
| 2014/0208797 A1 | 7/2014 | Kelley et al. |
| 2014/0216254 A1 | 8/2014 | Tammera et al. |
| 2015/0013377 A1 | 1/2015 | Oelfke |
| 2015/0068397 A1 | 3/2015 | Boulet et al. |
| 2015/0101483 A1 | 4/2015 | Perry et al. |
| 2015/0196870 A1 | 7/2015 | Albright et al. |
| 2015/0328578 A1 | 11/2015 | Deckman et al. |
| 2016/0023155 A1 | 1/2016 | Ramkumar et al. |
| 2016/0129433 A1 | 5/2016 | Tammera et al. |
| 2016/0166972 A1 | 6/2016 | Owens et al. |
| 2016/0236135 A1 | 8/2016 | Tammera et al. |
| 2016/0332105 A1 | 11/2016 | Tammera et al. |
| 2016/0332106 A1 | 11/2016 | Tammera et al. |
| 2017/0056814 A1 | 3/2017 | Marshall et al. |
| 2017/0113173 A1 | 4/2017 | Fowler et al. |
| 2017/0113175 A1 | 4/2017 | Fowler et al. |
| 2017/0136405 A1 | 5/2017 | Ravikovitch et al. |
| 2017/0266604 A1 | 9/2017 | Tammera et al. |
| 2017/0282114 A1 | 10/2017 | Owens et al. |
| 2017/0341011 A1 | 11/2017 | Nagavarapu et al. |
| 2017/0341012 A1 | 11/2017 | Nagavarapu et al. |
| 2018/0001301 A1 | 1/2018 | Brody et al. |
| 2018/0056229 A1 | 3/2018 | Denton et al. |
| 2018/0056235 A1 | 3/2018 | Wang et al. |
| 2018/0169565 A1 | 6/2018 | Brody et al. |
| 2018/0169617 A1 | 6/2018 | Brody et al. |
| 2018/0339263 A1 | 11/2018 | Dehaas et al. |

FOREIGN PATENT DOCUMENTS

| | | |
|---|---|---|
| EP | 0904827 | 3/1999 |
| EP | 1674555 | 6/2006 |
| EP | 2823872 | 1/2015 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 06006736 | 6/1992 |
| JP | 3477280 | 8/1995 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| KR | 101349424 | 1/2014 |
| WO | WO2002/024309 | 3/2002 |
| WO | WO2002/073728 | 9/2002 |
| WO | WO2005/090793 | 9/2005 |
| WO | WO2010/024643 | 3/2010 |
| WO | WO2011/139894 | 11/2011 |

OTHER PUBLICATIONS

U.S. Appl. No. 16/258,266, filed Jan. 25, 2019, Barnes et al.
U.S. Appl. No. 16/263,940, filed Jan. 31, 2019, Johnson.
U.S. Appl. No. 62/783,766, filed Dec. 21, 2019, Fulton et al.
Allen, M. P. et al., (1987) "Computer Simulation of Liquids" Clarendon Press, pp. 156-160.
Asgari, M. et al., (2014) "Designing a Commercial Scale Pressure Swing Adsorber for Hydrogen Purification" *Petroleum & Coal*, vol. 56(5), pp. 552-561.
Baerlocher, C. et al., (2017) International Zeolite Association's "Database of Zeolite Structures," available at http://www.iza-structure.org/databases/, downloaded Jun. 15, 2018, 1 page.
Burtch, N.C. et al., (2015) "Molecular-level Insight into Unusual Low Pressure $CO_2$ Affinity in Pillared Metal-Organic Frameworks," *J Am Chem Soc*, 135, pp. 7172-7180.
Beauvais, C. et al., (2004) "Distribution of Sodium Cations in Faujasite-Type Zeolite: A Canonical Parallel Tempering Simulation Study," *J Phys Chem B*, 108, pp. 399-404.
Cheung, O. et al., (2013) "Adsorption kinetics for $CO_2$ on highly selective zeolites NaKA and nano-NaKA," *Appl Energ*, 112, pp. 1326-1336.
Cygan, R. T. et al., (2004) "Molecular Models of Hydroxide, Oxyhydroxide, and Clay Phases and the Development of a General Force Field", *J Phys Chem B*, vol. 108, pp. 1255-1266.
Deem, M. W. et al., (2009) "Computational Discovery of New Zeolite-Like Materials", *J Phys Chem C*, 113, pp. 21353-21360.
Demiralp, E., et al., (1999) "Morse Stretch Potential Charge Equilibrium Force Field for Ceramics: Application to the Quartz-Stishovite Phase Transition and to Silica Glass", *Physical Review Letters*, vol. 82(8), pp. 1708-1711.
Dubbeldam, D. et al. (2016) "RASPA: molecular simulation software for adsorption and diffusion in flexible nanoporous materials" *Molecular Simulation*, (published online Feb. 26, 2015), vol. 42(2), pp. 81-101.
Dubbeldam, D., et al., (2013) "On the inner workings of Monte Carlo codes" *Molecular Simulation*, vol. 39, Nos. 14-15, pp. 1253-1292.
Earl, D. J. et al., (2005) "Parallel tempering: Theory, applications, and new perspectives," *Phys Chem Chem Phys*, vol. 7, pp. 3910-3916.
ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.
Fang, H. et al., (2013) "First principles derived, transferable force fields for $CO_2$ adsorption in Na-exchanged cationic zeolites," Phys Chem Chem Phys, vol. 15, pp. 12882-12894.
Fang, H., et al., (2012) "Prediction of $CO_2$ Adsorption Properties in Zeolites Using Force Fields Derived from Periodic Dispersion-Corrected DFT Calculations," J Phys Chem C, 10692, 116, ACS Publications.
Farooq, S. et al. (1990) "Continuous Countercurrent Flow Model for a Bulk Psa Separation Process," *AIChE J.*, v36 (2) p. 310-314.
FlowServe (2005) "Exceeding Expectations, US Navy Cuts Maintenance Costs With Flowserve GX-200 Non-Contacting Seal Retrofits," *Face-to-Face*, v17.1, 8 pgs.
Foster, M.D., et al. "A geometric solution to the largest-free-sphere problem in zeolite frameworks", *Microporous and Mesoporous Materials*, vol. 90, pp. 32-38.
Frenkel, D. et al., (2002) "Understanding Molecular Simulation: From Algorithms to Applications", 2nd ed., *Academic Press*, pp. 292-301.
Garcia, E. J., et al. (2014) "Tuning the Adsorption Properties of Zeolites as Adsorbents for $CO_2$ Separation: Best Compromise between the Working Capacity and Selectivity", *Ind. Eng. Chem. Res.*, vol. 53, pp. 9860-9874.
GE Oil & Gas (2007) "Dry Gas Seal Retrofit," Florene, Italy, www.ge.com/oilandgas, 4 pgs.

(56) References Cited

OTHER PUBLICATIONS

Harris, J. G. et al., (1995) "Carbon Dioxide's Liquid—Vapor Coexistence Curve and Critical Properties as Predicted by a Simple Molecular Model", *J Phys Chem,* vol. 99, pp. 12021-12024.

Hill, J. R. et al., (1995) "Molecular Mechanics Potential for Silica and Zeolite Catalysts Based on ab Initio Calculations. 2. Aluminosilicates", *J Phys Chem,* vol. 99, pp. 9536-9550.

Hopper, B. et al. (2008) "World's First 10,000 psi Sour Gas Injection Compressor," *Proceedings of the 37th Turbomachinery Symposium,* pp. 73-95.

Jain, S., et al. (2003) "Heuristic design of pressure swing adsorption: a preliminary study", *Separation and Purification Technology,* vol. 33, pp. 25-43.

Kim J et al. (2012) "Predicting Large CO2 Adsorption in Aluminosilicate Zeolites for Postcombustion Carbon Dioxide Capture", *J. Am. Chem. Soc.,* vol. 134, pp. 18940-18940.

Kärger, J., et al.(2012) "Diffusion in Nanoporous Materials", Whiley-VCH publisher, vol. 1, Chapter 16, pp. 483-501.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Lin, L., et al. (2012) "In silico screening of carbon-capture materials", *Nature Materials,* vol. 1, pp. 633-641.

Liu, Q. et al., (2010) "NaKA sorbents with high CO2-over-N2 selectivity and high capacity to adsorb CO2," *Chem Commun,* vol. 46, pp. 4502-4504.

Lowenstein, W., (1954) "The Distribution of Aluminum in the Tetra-Hedra of Silicates and Aluminates" Am Mineral, 92-96.

Neimark, A. V. et al., (1997) "Calibration of Pore Volume in Adsorption Experiments and Theoretical Models", *Langmuir,* vol. 13, pp. 5148-5160.

Palomino, M., et al. (2009) "New Insights on CO2-Methane Seapration Using LTA Zeolites with Different Si/Al Ratios and a First Comparison with MOFs", Langmar, vol. 26(3), pp. 1910-1917.

Patcas, F.C. et al.(2007) "CO Oxidation Over Structured Carriers: A Comparison of Ceramic Forms, Honeycombs and Beads", *Chem Engineering Science,* v. 62, pp. 3984-3990.

Peng, D. Y., et al., (1976) "A New Two-Constant Equation of State", *Ind Eng Chem Fundam,* vol. 15, pp. 59-64.

Pham, T. D. et al., (2013) "Carbon Dioxide and Nitrogen Adsorption on Cation-Exchanged SSZ-13 Zeolites", *Langmuir,* vol. 29, pp. 832-839.

Pophale, R., et al., (2011) "A database of new zeolite-like materials", *Phys Chem Chem Phys,* vol. 13(27), pp. 12407-12412.

Potoff, J. J. et al., (2001) "Vapor-Liquid Equilibria of Mixtures Containing Alkanes, Carbon Dioxide, and Nitrogen", AIChE J, vol. 47(7), pp. 1676-1682.

Rameshni, Mahin "Strategies for Sour Gas Field Developments," *Worley Parsons-Brochure,* 20 pp.

Reyes, S. C. et al. (1997) "Frequency Modulation Methods for Diffusion and Adsorption Measurements in Porous Solids," *J. Phys. Chem. B.* v101, pp. 614-622.

Rezaei, F. et al. (2009) "Optimum Structured Adsorbents for Gas Separation Process", *Chem. Engineering Science,* v. 64, pp. 5182-5191.

Richardson, J.T. et al. (2000) "Properties of Ceramic Foam Catalyst Supports: Pressure Dop", *Applied Catalysis A: General* v. 204, pp. 19-32.

Robinson, D. B., et al., (1985) "The development of the Peng-Robinson Equation and its Application to Phase Equilibrium in a System Containing Methanol," *Fluid Phase Equilibria,* vol. 24, pp. 25-41.

Ruthven, D. M. et al. (1996) "Performance of a Parallel Passage Adsorbent Contactor," *Gas. Sep. Purif,* vol. 10, No. 1, pp. 63-73.

Stahley, J. S. (2003) "Design, Operation, and Maintenance Considerations for Improved Dry Gas Seal Reliability in Centrifugal Compressors," *Dresser-Rand, Tech. Paper* 134, 15 pages.

Santos, M. S (2011) "New Cycle configuration to enhance performance of kinetic PSA processes" Chemical Engineering Science 66, pp. 1590-1599.

Snurr, R. Q. et al., (1993) "Prediction of Adsorption of Aromatic Hydrocarbons in Silicalite from Grand Canonical Monte Carlo Simulations with Biased Insertions", *J Phys Chem,* vol. 97, pp. 13742-13752.

Stemmet, C.P. et al. (2006) "Solid Foam Packings for Multiphase Reactors: Modelling of Liquid Holdup and Mass Transfer", *Chem. Engineering Research and Design,* v. 84(A12), pp. 1134-1141.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

Talu, O. et al., (2001), "Reference potentials for adsorption of helium, argon, methane, and krypton in high-silica zeolites," *Colloids and Surfaces A: Physicochemical and Engineering Aspects,* vol. 83-93, pp. 83-93.

Walton, K. S. et al., (2006) "CO2 adsorption in Y and X zeolites modified by alkali metal cation exchange," *Microporous and Mesoporous Mat,* vol. 91, pp. 78-84.

Willems, T. F. et al., (2012) "Algorithms and tools for high-throughput geometry-based analysis of crystalline porous materials" *Microporous Mesoporous Mat,* vol. 149, pp. 134-141.

Zukal, A., et al., (2009) "Isosteric heats of adsorption of carbon dioxide on zeolite MCM-22 modified by alkali metal cations", *Adsorption,* vol. 15, pp. 264-270.

\* cited by examiner

APPARATUS AND SYSTEM FOR SWING ADSORPTION PROCESSES RELATED THERETO

CROSS-REFERENCE TO RELATED APPLICATION

This is a divisional of U.S. patent application Ser. No. 15/670,768, filed Aug. 7, 2017, which claims the benefit of U.S. Provisional Patent Application 62/381,838, filed Aug. 31, 2016, entitled APPARATUS AND SYSTEM FOR SWING ADSORPTION PROCESSES RELATED THERETO, the entirety of which is incorporated by reference herein.

FIELD

The present techniques relate to a system associated with an enhanced swing adsorption process. In particular, the system relates to a swing adsorption process for removal of contaminants from a feed stream utilizing adsorbent beds which may be integrated with downstream equipment to enhance recovery of hydrocarbons.

BACKGROUND

Gas separation is useful in many industries and can typically be accomplished by flowing a mixture of gases over an adsorbent material that preferentially adsorbs one or more gas components, while not adsorbing one or more other gas components. The non-adsorbed components are recovered as a separate product.

One particular type of gas separation technology is swing adsorption, such as temperature swing adsorption (TSA), pressure swing adsorption (PSA), partial pressure purge swing adsorption (PPSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated in a PSA process, for example, by reducing the pressure, thereby releasing the adsorbed carbon dioxide. The adsorbent material is then typically purged and repressurized. Then, the adsorbent material is ready for another adsorption cycle.

The swing adsorption processes typically involve one or more adsorbent bed units, which include adsorbent beds disposed within a housing configured to maintain fluids at various pressures for different steps in an adsorption cycle within the unit. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic forms or the like.

Further, various adsorbent bed units may be coupled together with conduits and valves to manage the flow of fluids. Orchestrating these adsorbent bed units involves coordinating the cycles for each adsorbent bed unit with other adsorbent bed units in the system. A complete PSA cycle can vary from seconds to minutes as it transfers a plurality of gaseous streams through one or more of the adsorbent bed units.

Typical sour gas treating facilities may use amine systems to remove acid gas from hydrocarbon feed stream. The process utilizes the amine system to divide the streams into a water saturated hydrocarbon stream and a water saturated acid gas stream. The hydrocarbon stream may then be monetized, which typically requires some level of dehydration. For cryogenic applications, the hydrocarbon stream may be passed through a molecular sieve system to form a dry sweet gas stream. The acid gas stream may be reinjected into the ground which also requires some level of dehydration. The acid gas stream from the amine system may be passed to a tri-ethylene glycol (TEG) system to form a dry acid gas stream. Unfortunately, typical amine systems require the gas streams to be saturated with water which results in the use of large amounts of water and requires additional make-up water for the moisture (e.g., water) lost in the hydrocarbon and acid gas streams. The requirement for water may be problematic in regions that do not have sufficient water supplies and/or in regions where disposal of water may be expensive. Further, the use of the large amounts of water may also result in larger equipment footprints.

Accordingly, there remains a need in the industry for apparatus, methods, and systems that provide enhancements to the processing of gaseous streams with adsorbent beds. The present techniques provide enhancements by utilizing swing adsorption processes to separate contaminants from a feed stream and regenerate the adsorbent bed units with less water than utilized in conventional approaches. The present techniques overcomes the drawbacks of conventional systems by using a specific configuration.

SUMMARY OF THE INVENTION

In an embodiment, a cyclical swing adsorption process for removing contaminants from a feed stream is described. The cyclical swing adsorption process comprises: a) performing one or more adsorption steps, wherein each of the adsorption steps comprises passing a feed stream from a solvent based gas treating system, such as an amine system, through a swing adsorption system to remove one or more contaminants from the feed stream and to form a product stream; b) performing one or more purge steps, wherein each of the purge steps comprises passing a purge stream through the swing adsorption system in a counter flow direction relative to the flow of the feed stream to form a purge product stream, wherein the purge product stream is passed to the solvent based gas treating system; and c) repeating the steps a) to b) for at least one additional cycle.

Other enhancement may include: i) performing one or more acid gas adsorption steps, wherein each of the acid gas adsorption steps comprises passing the wet acid gas stream from the solvent based gas treating system through a second swing adsorption system to remove one or more contaminants from the wet acid gas stream and to form a dry acid gas stream, ii) performing one or more acid gas purge steps, wherein each of the acid gas purge steps comprises passing the feed stream through the second swing adsorption system in a counter flow direction relative to the flow of the wet acid gas stream to form an acid gas purge product stream, wherein the acid gas purge product stream is passed to the solvent based gas treating system, and iii) repeating the steps i) to ii) for at least one additional cycle; wherein greater than 95 volume percent (%) of the acid gas in the purge stream is recycled to the second swing adsorption system from the solvent based gas treating system in the wet acid gas stream; and/or wherein greater than 95 volume % of the hydrocarbons in the purge stream are recycled to the swing adsorption system from the solvent based gas treating system in the feed stream.

In another embodiment, a system for removing contaminants from a gaseous feed stream, the system comprising: a swing adsorption system configured to receive a facility feed stream and to pass at least a first portion of the facility feed stream though a first plurality of swing adsorption bed units, wherein each of the first plurality of swing adsorption bed units are configured to perform a first swing adsorption process to remove water from the each of the first plurality of swing adsorption bed units during a purge step and form a first purge product stream; an solvent based gas treating system in fluid communication with the swing adsorption system and configured to separate one or more contaminants from the purge product stream to form a feed stream and an acid gas stream and to pass the feed stream from the solvent based gas treating system to the swing adsorption system.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, "solvent based gas treating system" or "solvent based gas treating process" refers to a method or system that utilizes a solvent (e.g., a liquid solvent) to absorb a specific species (typically a contaminant) from an input stream to generate a gas product stream that has higher purity of the desired product than the input stream and a solvent stream that includes a portion of the specific species. The method or system may perform the steps of: exposing an input stream to a liquid solvent to adsorb a specific species from the input stream and then removing the specific species from the solvent stream via a regeneration step, which may involve the use of heat to promote the removal of the adsorbed species.

As used herein, volume percent is based on standard conditions. The standard conditions for a method may be normalized to the temperature of 0° Celsius (C) (e.g., 32° Fahrenheit (F)) and absolute pressure of 100 kiloPascals (kPa) (1 bar).

As used herein, "conduit" refers to a tubular member forming a channel through which fluids or the other materials are conveyed. The conduit may include one or more of a pipe, a manifold, a tube or the like.

The present techniques relate to a swing adsorption process (e.g., a rapid cycle process) for the dehydration of a feed stream (e.g., stream from an amine plant) utilizing rapidly cycled adsorbent beds. The present techniques integrate rapid cycle swing adsorption processes for a contaminant removal system to lessen the water utilized in the process. The present techniques provide enhancements with a swing adsorption system that also provides several other benefits, such as reduction in footprint, size, weight, costs, energy needs, and fresh water/water treatment needs.

For example, the present techniques may enhance processes for gas treatment with solvent based gas treating system, such as amine systems, fed with a dry gas stream. By way of example, prior gas processing (such as condensate and natural gas liquids (NGL) recovery) typically involves dehydration. As a specific example, the solvent based gas treating system may be an amine process, which receives a dry gas feed stream (the resulting stream from prior processing) and may contain predominately hydrocarbons along with some contaminants (e.g., acid gas, which are streams that comprises $CO_2$ and/or $H_2S$) and less than (<) 10 parts per million volume (ppmv) of $H_2O$. This dry gas stream may also be referred to as the overall facility feed. This overall facility feed stream may be introduced to an amine system to lessen or remove contaminants, such as $CO_2$ and $H_2S$, from the dry gas feed stream. Acid gas removal with an amine solvent typically requires the gas stream to be saturated with water. As a result, the process continuously needs makeup water for continued processing of the gas stream. The resulting sweet gas stream and acid gas stream from the amine process are saturated with water. For these streams, there is a need to dehydrate the streams before introduction into pipelines for sales, liquefaction and/or injection to meet the predetermined specifications. The predetermined specification is dependent upon several factors, such as the ambient conditions, corrosion constraints, and may be as low as 10 ppmv or 1 ppmv.

The present techniques provide a method to remove contaminants from the resulting streams from the solvent based gas treating process, which may be an amine process, to below the specified dehydration levels and transfer the contaminants to the overall facility feed stream entering the solvent based gas treating system or process. The present techniques replace the dehydration systems downstream of a conventional solvent based gas treating process with rapid cycle swing adsorption units. By way of example, the overall facility feed stream, which is a dry gas stream, is divided between a first swing adsorption process and a second swing adsorption process, as the purge stream for the respective swing adsorption processes. These streams remove water from the respective swing adsorption processes. The resulting purge product stream has a higher concentration of water relative to the concentration of water from the feed stream provided to the swing adsorption processes. The purge product streams (e.g., wet gas streams) from the swing adsorption processes are combined and are passed to a solvent based gas treating system (e.g., an amine system) to separate a portion of the acid gas from the remaining stream to form a wet hydrocarbon rich stream and a wet acid gas stream. From the solvent based gas treating system, the wet hydrocarbon rich steam (e.g., a wet sweet gas stream) is passed through the first swing adsorption process to dehydrate the wet hydrocarbon rich steam to levels below the preferred specification, such as pipeline specifications. For example, the pipeline specification may be less than 150 ppmv of $H_2O$, less than 105 ppmv of $H_2O$, less than 30 ppmv of $H_2O$, less than 10 ppmv of $H_2O$, less than 1 ppmv of $H_2O$ or less than 0.1 ppmv of $H_2O$. Also, the acid gas stream from the solvent based gas treating system is passed through the second swing adsorption process to dehydrate the acid gas stream to levels below a preferred specification, such as injection specifications. The injection specification may be less than 150 ppmv of $H_2O$, less than 105 ppmv of $H_2O$, less than 30 ppmv of $H_2O$, less than 10 ppmv of $H_2O$, less than 1 ppmv of $H_2O$ or less than 0.1 ppmv of $H_2O$. Beneficially, the present techniques may also reduce in footprint, size, weight, costs, energy needs, and fresh water/water treatment needs of the system as compared to conventional systems.

In this configuration, the first swing adsorption process may be performed with a first swing adsorption system that may include various adsorbent bed units, which are configured to operate specific cycles. The first swing adsorption system (e.g., sweet dehydration swing adsorption system) may be used to dehydrate the hydrocarbon rich stream. The cycle may include an adsorption step and a regeneration step (e.g., one or more purge steps), which may also include a blowdown, heating step and/or other repressurization step, as well. For example, the wet hydrocarbon rich stream from the solvent based gas treating system may be provided to the first swing adsorption system as a feed stream to one of the adsorbent bed units in that system, while the portion of the dry gas stream from the gas treatment plant (GTP) system may be provided as the as the purge stream for one or more of the other adsorbent bed units in the system. As the feed stream passes through the adsorbent bed units, moisture is removed from the stream and a dry hydrocarbon rich stream is conducted away from the adsorbent bed units on the product side. The moisture removed from the adsorbent bed units is conducted away by the purge stream during the regeneration step, which results in a wet purge product stream. Thus, the process serves as a pre-saturation step for the stream entering the solvent based gas treating system, which may lessen the make-up water requirements.

The first swing adsorption system may include adsorbent bed units that perform various steps in the cycle to dehydrate the hydrocarbon rich stream. By way of example, the steps may include one or more feed steps, one or more depressurization steps, one or more purge steps, one or more recycle steps, and one or more re-pressurization steps. As a specific example of a cycle, the one or more feed steps may involve passing a wet feed stream through the adsorbent bed, which is provided at a feed pressure, which may be about 70 bar. The one or more depressurization steps may involve passing a stream from the adsorbent bed unit until the pressure within the adsorbent bed unit is at a depressurization pressure, such as about 40 bar. The one or more purge steps may include passing a purge stream, which is a dry gas stream from the overall facility feed stream. The purge stream may contain less than or equal to 3 ppmv of moisture. The dry hydrocarbon rich stream, which is the product stream and may be provided to a pipeline, may contain less than or equal to 0.7 ppmv of moisture. The feed stream for the first swing adsorption system from the solvent based gas treating system may be provided at liquefied natural gas (LNG) specifications (e.g., less than or equal to 50 ppmv $CO_2$). The molar ratio of the purge to feed stream may be about 0.86 for this example.

In certain embodiments, a recycle step may be utilized as the adsorbent bed unit may be full of gas coming from the overall facility feed stream which has a large amount of $CO_2$ and $H_2S$ upon completion of the purge step. As the feed stream for the first swing adsorption system from the solvent based gas treating system may be provided at LNG specifications (e.g., less than or equal to 50 ppmv $CO_2$), to ensure the product gas of the swing adsorption system maintains the LNG specification, a sweeping recycle step may be utilized where a portion of the product stream is recycled and passed through the regenerated bed concurrently to sweep out the gas in the adsorbent bed unit and recycle the resulting stream to the solvent based gas treating system. The amount of recycle may be adjusted, and may be less than 0.5% of the total feed to the first swing adsorption system.

Also, the second swing adsorption process may be performed by a second swing adsorption system that may include various adsorbent bed units, which are configured to operate on specific cycles. The cycle may include an adsorption step and a regeneration step (e.g., one or more purge steps), which may also include a blowdown, heating step and/or other repressurization step, as well. For example, the wet acid gas stream from the solvent based gas treating system may be provided to the second swing adsorption system as a feed stream to one of the adsorbent bed units in that system, while the portion of the dry gas stream from the overall facility feed may be provided as the purge stream for one or more of the other adsorbent bed units in the system. As the feed stream passes through the adsorbent bed units, moisture is removed from the stream and a dry acid gas stream is conducted away from the adsorbent bed units on the product side. The moisture removed from the adsorbent bed units is conducted away by the purge stream during the regeneration step, which results in a wet purge product stream. Thus, the process serves as another pre-saturation step for the stream entering the solvent based gas treating system, which may lessen the make-up water requirements.

The second swing adsorption system may include adsorbent bed units that perform various steps in the cycle to dehydrate the acid gas stream. By way of example, the steps may include one or more feed steps, one or more re-pressurization steps, one or more purge steps and/or one or more depressurization steps. The one or more feed steps may include passing the stream from the GTP system at a pressure of about 37 bar, while the one or more re-pressurization steps may include increasing the pressure within the adsorbent bed units to about 40 bar. In the one or more purge steps, the purge stream is the stream from the GTP system, which may be available at less than or equal to 3 ppmv of moisture. The dry product stream (e.g., dry acid gas stream that is provided to injection) may contain less than or equal to 0.8 ppmv of moisture. The molar ratio of purge stream to feed stream may be about 1.8.

Further, various enhancements may be provided in certain embodiments. For example, the purge streams may be heated prior to passing through the swing adsorption systems. The stream may be heated by a heat exchanger, boiler or other suitable configuration. The purge stream temperature may be in the range between 40° F. and 450° F. or in the range between 80° F. and 350° F.

Moreover, the direction of the flow through the respective adsorbent bed units (e.g., through the adsorbent bed) may be concurrent flow, countercurrent flow or cross flow in certain configurations. In certain preferred configurations, the streams may be countercurrent flow. For example, the feed stream may flow from the feed end to the product end of the adsorbent bed, while the purge stream may flow from the product end to the feed end of the adsorbent bed. As another example, the feed stream may flow from the feed end to the product end of the adsorbent bed, while the purge stream may flow from the feed end to the product end of the adsorbent bed. As yet another example, the feed stream may flow from the feed end to the product end of the adsorbent bed, while the purge stream may flow from a first side to a second side of the adsorbent bed.

Beneficially, the use of swing adsorption processes in this configuration reduces or eliminates the heating needs associated dehydration systems (e.g., a tri-ethylene glycol (TEG) and/or molecular sieve dehydration systems). Furthermore, the configurations may be smaller, lighter, and less expensive than conventional TEG and/or mole sieve systems. By way of example, the swing capacity per weight of the swing adsorption system (e.g., adsorbent beds) may be less than conventional TSA molecular sieve dehydration systems, without the requirement for complete drying of the adsorbent bed (e.g., making the quantity of adsorbent required larger), the use of rapid cycles lessens the adsorbent quantity as compared to conventional TSA molecular sieve dehydration systems in that the required adsorbent quantity is ten to more than one hundred times smaller than conventional TSA molecular sieve dehydration systems. Also, it may not be required that the purge stream passed through the adsorbent bed completely dries the feed end of the respective adsorbent beds.

The present techniques may also include various pressures for the feed stream and the purge stream. For example, the feed pressure may be based on the preferred adsorption feed pressure, which may be in the range between 400 pounds per square inch absolute (psia) and 2,200 psia, or in the range between 500 psia and 1,200 psia for the hydrocarbon dehydration system. In particular, the pressures for the streams within the acid gas swing adsorption system may be in the range between 100 psia and 2,200 psia, or more preferably in the range between 300 psia and 2,000 psia. Also, the purge pressure may be based on the overall facility inlet feed gas pressure, which may be in the range between 400 psia and 1400 psia, or in the range between 600 psia and 1200 psia.

As another enhancement, the present techniques may provide dehydration through the use of a rapid cycle swing adsorption process, such as a rapid cycle PSA process or a rapid cycle pressure and temperature swing adsorption (PTSA) process. As noted above, the swing capacity per weight of the adsorbent bed may be less than conventional molecular sieve dehydration. Without the requirement to completely dry of the adsorbent bed, less adsorbent is utilized as compared to conventional molecular sieve dehydration process.

In the present techniques, the product end of the adsorbent bed is maintained nearly dry (e.g., the water loading for the region near the product end is less than 1 mole per kilogram (mol/kg), is less than 0.5 mol/kg, or is less than 0.1 mol/kg), but is it is not essential to fully dry the feed end of the adsorbent bed. The feed end or feed side is the portion of the adsorbent bed that the feed stream initially enters, while the product end is the portion of the adsorbent bed opposite from the feed end and where the feed stream exits the adsorbent bed. The loading level of water may be lower on the feed side of the adsorbent bed during the purge step, but the length of adsorbent bed that contains water may be reduced during the purge step. For example, an adsorbate loaded region may be a specific portion of the adsorbent bed from the feed end of the adsorbent bed to 10% of the bed length, from the feed end of the adsorbent bed to 40% of the bed length or from the feed end of the adsorbent bed to 75% of the bed length. Utilizing only a portion of the bed length provides that the product end of the bed remains rigorously dry and enables extremely low product water concentrations. Further, maintaining a significant portion of the product end of the bed dry provides flexibility for non-uniformity of gas passage channels in embodiments where a structured adsorbent, such as a monolith, is used for the adsorbent bed or adsorber structure. The product region may be a specific portion of the adsorbent bed from the product end of the adsorbent bed to 10% of the bed length, from the product end of the adsorbent bed to 25% of the bed length or from the product end of the adsorbent bed to 40% of the bed length. The difference between the total adsorbent bed water loading during the purge step and during the adsorption step is the basis of the swing capacity of the process.

In one or more embodiments, the present techniques can be used for any type of swing adsorption process. Non-limiting swing adsorption processes for which the present techniques may include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes, such as pressure and/or temperature swing adsorption. Exemplary kinetic swing adsorption processes are described in U.S. Patent Application Publication Nos. 2008/0282892, 2008/0282887, 2008/0282886, 2008/0282885, 2008/0282884 and 2014/0013955, which are each herein incorporated by reference in their entirety.

Adsorptive separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare feed products (e.g., natural gas products) by removing contaminants and heavy hydrocarbons (e.g., hydrocarbons having at least two carbon atoms). The provided processes, apparatus, and systems are useful for preparing gaseous feed streams for use in utilities, including separation applications. The separation applications may include dew point control; sweetening and/or detoxification; corrosion protection and/or control; dehydration; heating value; conditioning; and/or purification. Examples of utilities that utilize one or more separation applications include generation of fuel gas; seal gas; non-potable water; blanket gas; instrument and control gas; refrigerant; inert gas; and/or hydrocarbon recovery.

In certain embodiments, the present techniques may be used to remove contaminants from feed streams, such as acid gas from hydrocarbon streams. Acid gas removal technology may be useful for gas reserves exhibiting higher concentrations of acid gas (e.g., sour gas resources). Hydrocarbon feed streams vary widely in amount of acid gas, such as from several parts per million acid gas to 90 volume percent (vol. %) acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$. Accordingly, the present techniques may include equipment to remove various contaminants, such as $H_2S$, $CO_2$ or heavy hydrocarbons, such as Benzene, Toluene and Xylene, to desired levels.

In certain embodiments, the gaseous feed stream may predominately comprise hydrocarbons alone with one or more contaminants. For example, the gaseous feed stream may be a hydrocarbon containing stream having greater than one volume percent hydrocarbons based on the total volume of the feed stream. Further, the gaseous feed stream may include hydrocarbons and $H_2O$, wherein the $H_2O$ is one of the one or more contaminants and the gaseous feed stream comprises $H_2O$ in the range of 50 parts per million (ppm) molar to 1,500 ppm molar; or in the range of 500 ppm molar to 1,500 ppm molar. Moreover, the gaseous feed stream may include hydrocarbons and $H_2O$, wherein the $H_2O$ is one of the one or more contaminants and the gaseous feed stream comprises $H_2O$ in the range of two ppm molar to saturation levels in the gaseous feed stream.

In other embodiments, the present techniques may be used to lessen the water content of the stream to a specific level by the swing adsorption process. The specific level may be related to dew point of desired output product (e.g., the water content should be lower than the water content required to obtain a dew point below the lowest temperature of the stream in subsequent process and is related to the feed pressure).

In one or more embodiment, the present techniques may be used as an integration of a rapid cycle swing adsorption process for removal of contaminants from a feed stream. For example, the configuration may include $CO_2$ removal, which may be limited to less than the pipeline specifications. In particular, as the gaseous feed stream may include hydrocarbons and one or more contaminants, such as $CO_2$.

Further, in one or more embodiments, the present techniques may include a specific process flow to remove contaminants, such as water ($H_2O$). For example, the process may include an adsorbent step and a regeneration step, which form the cycle. The adsorbent step may include passing a gaseous feed stream at a feed pressure and feed temperature through an adsorbent bed unit to separate one or more contaminants from the gaseous feed stream to form a product stream. The feed stream may be passed through the adsorbent bed in a forward direction (e.g., from the feed end of the adsorbent bed to the product end of the adsorbent bed). Then, the flow of the gaseous feed stream may be interrupted for a regeneration step. The regeneration step may include one or more depressurization steps, one or more purge steps and/or one or more re-pressurization steps. The depressurization steps may include reducing the pressure of the adsorbent bed unit by a predetermined amount for each successive depressurization step, which may be a single step and/or may be a blowdown step. The depressurization step may be provided in a forward direction or may preferably be provided in a countercurrent direction (e.g., from the product end of the adsorbent bed to the feed end of the adsorbent bed). The purge step may include passing a purge stream into the adsorbent bed unit, which may be a once through purge step and the purge stream may be provided in countercurrent flow relative to the feed stream. The output stream from the purge step may be conducted away to a solvent based gas treating system, such as an amine system. Then, the one or more re-pressurization steps may be performed, wherein the pressure within the adsorbent bed unit is increased with each re-pressurization step by a predetermined amount with each successive re-pressurization step. Then, the cycle may be repeated for additional streams. The cycle duration may be for a period greater than 1 second and less than 600 seconds, for a period greater than 2 seconds and less than 300 seconds, for a period greater than 2 seconds and less than 200 seconds, or for a period greater than 2 seconds and less than 90 seconds.

In certain configurations, a cyclical swing adsorption process for removing contaminants from a feed stream is described. The cyclical swing adsorption process comprises: a) performing one or more adsorption steps, wherein each of the adsorption steps comprises passing a feed stream from an solvent based gas treating system through a swing adsorption system to remove one or more contaminants from the feed stream and to form a product stream; b) performing one or more purge steps, wherein each of the purge steps comprises passing a purge stream through the swing adsorption system in a counter flow direction relative to the flow of the feed stream to form a purge product stream, wherein the purge product stream is passed to the solvent based gas treating system; and c) repeating the steps a) to b) for at least one additional cycle.

In other embodiments, the cyclical swing adsorption process may include other enhancements. The enhancements may include: wherein the solvent based gas treating system separates one or more contaminants from the purge product stream to form a wet hydrocarbon rich stream and a wet acid gas stream; wherein performing one or more adsorption steps comprises passing the wet hydrocarbon rich stream as the feed stream from the solvent based gas treating system through the adsorbent bed unit to remove water from the wet hydrocarbon rich stream and to form a dry hydrocarbon rich stream as the product stream; wherein the cycle duration is greater than 1 second and less than 600 seconds; wherein the feed stream is a hydrocarbon containing stream having greater than one volume percent hydrocarbons based on the total volume of the feed stream; wherein the feed pressure is in the range between 400 pounds per square inch absolute (psia) and 1,400 psia; wherein the cycle duration is greater than 2 seconds and less than 300 seconds; and/or wherein the cyclical swing adsorption process is a cyclical rapid cycle swing adsorption process. Also, other enhancements may include: i) performing one or more acid gas adsorption steps, wherein each of the acid gas adsorption steps comprises passing the wet acid gas stream from the solvent based gas treating system through a second swing adsorption system to remove one or more contaminants from the wet acid gas stream and to form a dry acid gas stream, ii) performing one or more acid gas purge steps, wherein each of the acid gas purge steps comprises passing the feed stream through the second swing adsorption system in a counter flow direction relative to the flow of the wet acid gas stream to form an acid gas purge product stream, wherein the acid gas purge product stream is passed to the solvent based gas treating system, and iii) repeating the steps i) to ii) for at least one additional cycle; wherein greater than 95 volume % of the acid gas in the purge stream is recycled to the second swing adsorption system from the solvent based gas treating system in the wet acid gas stream; and/or wherein greater than 95 volume % of the hydrocarbons in the purge stream are recycled to the swing adsorption system from the solvent based gas treating system in the feed stream.

In another embodiment, a system for removing contaminants from a gaseous feed stream, the system comprising: a swing adsorption system configured to receive a facility feed stream and to pass at least a first portion of the facility feed stream though a first plurality of swing adsorption bed units, wherein each of the first plurality of swing adsorption bed units are configured to perform a first swing adsorption process to remove water from the each of the first plurality of swing adsorption bed units during a purge step and form a first purge product stream; an solvent based gas treating system in fluid communication with the swing adsorption system and configured to separate one or more contaminants from the purge product stream to form a feed stream and an acid gas stream and to pass the feed stream from the solvent based gas treating system to the swing adsorption system.

In other embodiments, the cyclical swing adsorption process may include other enhancements. The enhancements may include: wherein the swing adsorption system is configured to adsorb the water from the feed stream in one of the first plurality of swing adsorption bed units to form the first product stream; a splitter unit configured to divide the facility feed stream into the at least a first portion of the overall facility feed stream; wherein the splitter unit is further configured to divide the facility feed stream into a second portion of the facility feed stream and the swing adsorption system further comprises a second plurality of swing adsorption bed units, wherein each of the second plurality of swing adsorption bed units is configured to perform a second swing adsorption process to remove water from the each of the second plurality of swing adsorption bed units by passing the second portion of the facility feed stream through the each of the second plurality of swing adsorption bed units to form a second purge product stream and remove water from the acid gas stream in each of the second plurality of swing adsorption bed units by passing the acid gas stream through the each of the second plurality of swing adsorption bed units to form a second product stream; wherein the swing adsorption system is configured to combine the second purge product stream with the purge product stream upstream of the amine system; wherein the swing adsorption system is configured to adsorb the water from the acid gas stream in one of the second plurality of swing adsorption bed units to form the second product stream; wherein the second product stream comprises predominately acid gas; wherein the second product stream is passed to injection equipment and/or wherein the first product stream comprises predominately hydrocarbons. The present techniques may be further understood with reference to the FIGS. 1 to 4 below.

Figure 1:
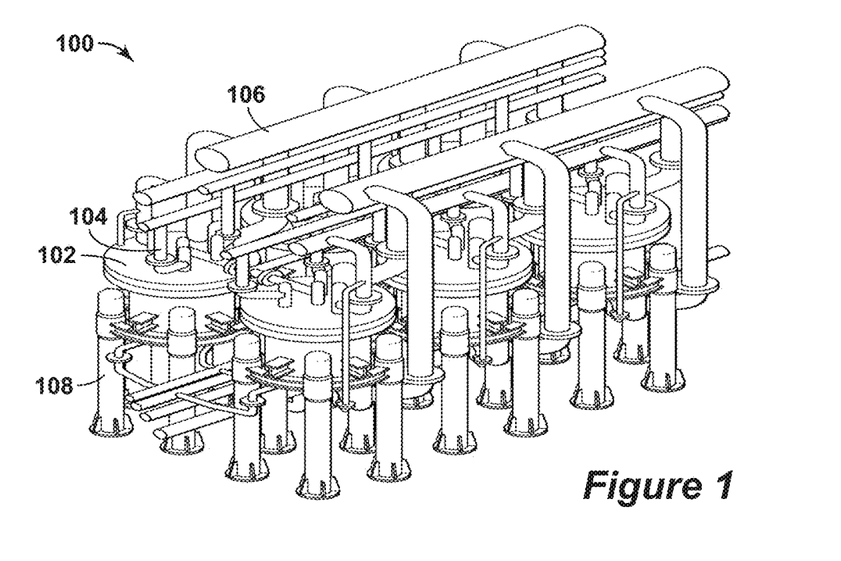
FIG. 1 is a three-dimensional diagram of the swing adsorption system with six adsorbent bed units and interconnecting piping in accordance with an embodiment of the present techniques.

FIG. 1 is a three-dimensional diagram of the swing adsorption system 100 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits, such as conduit 104, for managing the flow of fluids through, to or from the adsorbent bed within the adsorbent bed unit 102. These conduits from the adsorbent bed units 102 may be coupled to a manifold, such as manifold 106, to distribute the flow of the stream to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 108, which are dedicated to the adsorbent bed unit and may be dedicated to one or more step in the swing adsorption process.

As an example, which is discussed further below in FIG. 2, the adsorbent bed unit 102 may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
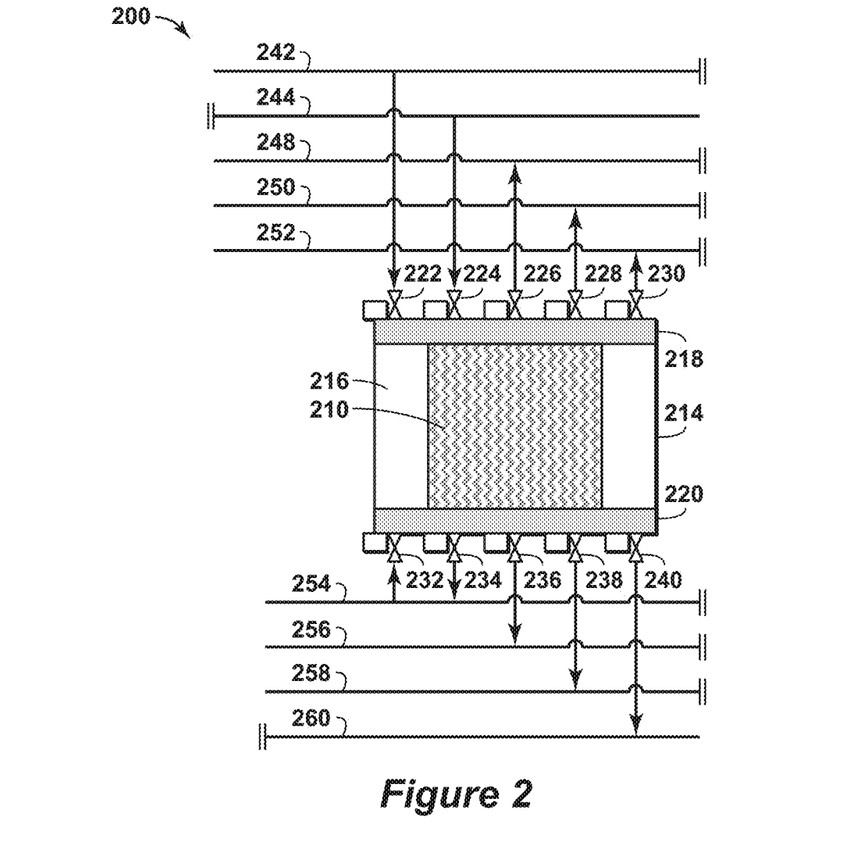
FIG. 2 is a diagram of a portion of an adsorbent bed unit having associated valve assemblies and manifolds in accordance with an embodiment of the present techniques.

FIG. 2 is a diagram 200 of a portion of an adsorbent bed unit having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure between 0 bara (bar absolute) or 0.1 bara and 100 bara within the interior region.

The upper head 218 and lower head 220 contain openings in which valve structures can be inserted, such as valve assemblies 222 to 240, respectively (e.g., poppet valves). The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow passages through the inlet manifolds 242 and 244 and the outlet manifolds 248, 250 and 252, while the lower head 220 contains various openings (not shown) to provide flow passages through the inlet manifold 254 and the outlet manifolds 256, 258 and 260. Disposed in fluid communication with the respective manifolds 242 to 260 are the valve assemblies 222 to 240. If the valve assemblies 222 to 240 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets. Further, while this configuration has valve assemblies 222 to 240, the number and operation of the valves may vary (e.g., the number of valves) based on the specific cycle being performed.

In swing adsorption processes, the cycle involves two or more steps that each has a certain time interval, which are summed together to be the cycle time. These steps include the regeneration step of the adsorbent bed following the adsorption step or feed step using a variety of methods including pressure swing, vacuum swing, temperature swing, purging (via any suitable type of purge fluid for the process), and combinations thereof. As an example, a swing adsorption cycle may include the steps of adsorption, depressurization, purging, and re-pressurization. When performing the separation at high pressure, depressurization and re-pressurization, which may be referred to as equalization steps, are performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

As noted above, conventional systems for dehydration is typically accomplished using molecular sieve adsorption processes and TEG processes. The conventional systems (e.g., molecular sieve units) are very large (e.g., are a large footprint and involve more adsorbent than the present techniques). In addition, the conventional approaches maintain a narrow mass transfer zone, or sharp adsorption front to maximize bed utilization, while maintaining rigorous dehydration. A schematic diagram of a conventional adsorption system having an amine system, a molecular sieve system and a TEG system is shown below in FIG. 3.

Figure 3:
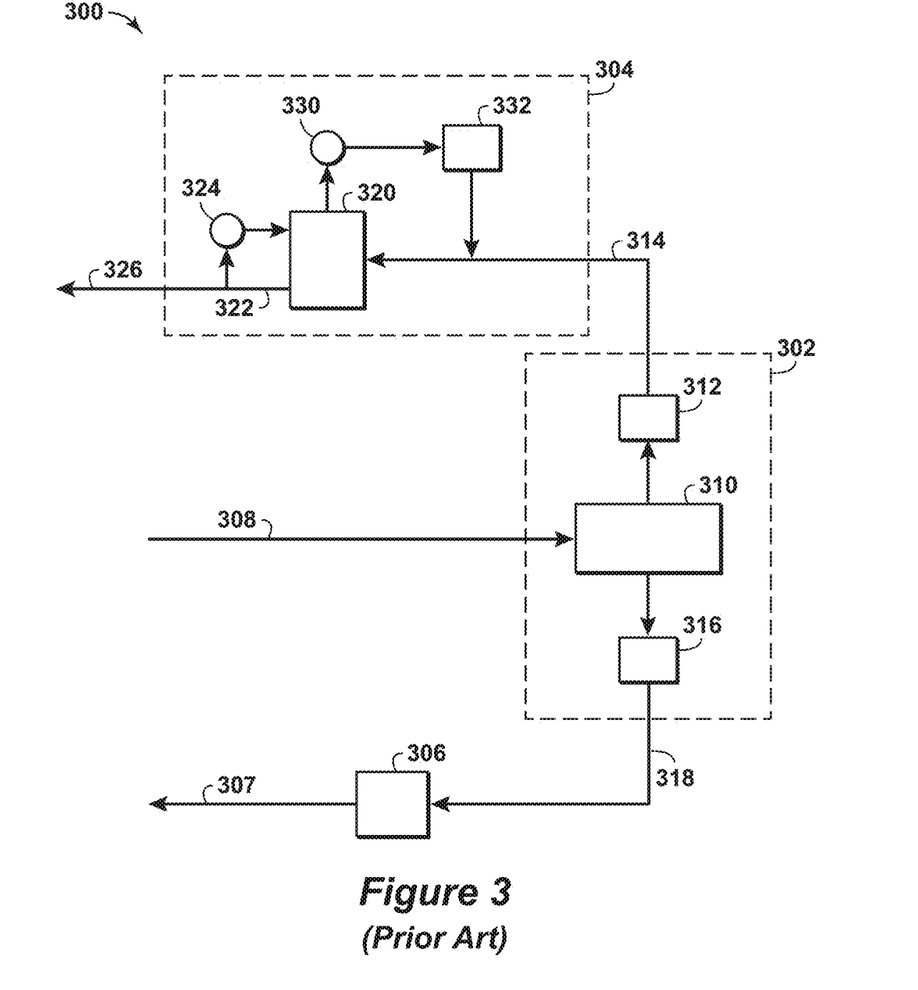
FIG. 3 is a diagram of a conventional system for removing contaminants from a feed stream to form a dry hydrocarbon rich stream and a dry acid gas stream.

FIG. 3 is a diagram 300 of a conventional system for removing contaminants from a feed stream to form a dry hydrocarbon stream and a dry gas stream. In this configuration, an overall facility feed stream is provided via conduit 308. This stream may be a dry gas stream, which may contain less than (<) 10 parts per million volume (ppmv) of water ($H_2O$). This feed stream is introduced to an amine unit 310 in the amine system 302 to remove $CO_2$ and $H_2S$ from the feed stream. The amine unit 310 is used to remove acid gas with an amine solvent. The amine solvent is an aqueous solvent, and involves saturating the overall facility feed stream with water. This results in a continuous need for makeup water, as part of the process. The saturated or wet hydrocarbon rich stream is passed to a compression unit 312 configured to compress the saturated or wet hydrocarbon rich stream. The compressed saturated or wet hydrocarbon rich stream is passed via conduit 314 to a molecular sieve system 304. Similarly, the saturated or wet acid gas stream is passed to a compression unit 316 configured to compress the saturated or wet acid gas stream. The compressed saturated or wet acid gas stream is then passed via conduit 318 to a TEG system 306.

The molecular sieve system 304 receives the resulting compressed saturated hydrocarbon rich stream and is configured to dehydrate the stream in a molecular sieve units, such as molecular sieve unit 320. The molecular sieve system 304 may involve one or more molecular sieve units that perform an adsorption step and a regeneration step in processing the input stream to remove water from the steam. The adsorption step separates contaminants, such as water from the stream, by adsorbing the water into the adsorbent material within the respective molecular sieve units. The dry hydrocarbon rich stream is passed from the molecular sieve unit 320 via conduit 322. The regeneration step may use temperature to remove all of the contaminants, such as water from the adsorbent material, by heating the adsorbent material within the respective molecular sieve units. A portion of the dry hydrocarbon rich stream is passed to a heat exchanger 324 and then recycled to the molecular sieve unit 320, while the remaining portion of the dry hydrocarbon rich stream is passed via conduit 326. The remaining portion of the dry hydrocarbon rich stream may be passed to a pipeline or storage tank. The portion of hydrocarbon rich stream recycled to the molecular sieve unit is used to remove contaminants, such as water from the adsorbent material. The resulting wet gas stream may be compressed in booster compressor 330, and cooled to knockout contaminant water in water knockout system 332. The resulting hydrocarbon stream is recycled to conduit 314. While a representative adsorption dehydration system is described herein, a TEG dehydration system may also be used to dehydrate the gas stream in conduit 314.

The TEG system 306 receives the saturated or wet sour gas stream and is configured to dehydrate the stream in the TEG system 306. The dry acid gas stream is passed from the TEG system 306 via conduit 307. The dry acid gas stream may be passed to injection equipment, acid gas storage tanks, or subsequent treatment systems.

In contrast to the conventional system, the present techniques provide a configuration to dehydrate the hydrocarbon and acid gas streams, lessen the water usage and remove contaminants in an enhanced manner. The present techniques may lessen footprint, size, weight, costs, energy needs, additional equipment and fresh water/water treatment needs by utilizing swing adsorption processes. In the present techniques, the two dehydration systems, such as the molecular sieve system 304 and TEG system 306 of FIG. 3, are replaced with swing adsorption systems.

By way of example, the configuration may include two swing adsorption systems to replace conventional dehydration systems. For a first or sweet swing adsorption system, a wet hydrocarbon rich stream is utilized as the feed stream for an adsorption step in this swing adsorption system, while a portion of a dry overall facility feed stream, is utilized in the regeneration step as a purge stream in the first swing adsorption system. As the feed stream (e.g., wet hydrocarbon rich stream) moves through the respective adsorbent beds in the first swing adsorption system, moisture is removed from this stream and a dry hydrocarbon rich stream exits the adsorbent beds on the product side. In the regeneration step, the moisture is removed from the adsorbent bed and is conducted away by the purge stream (e.g., dry overall facility feed stream), which in turn results a wet purge product that is passed to the amine system. This process, thus, serves as a pre-saturation step for the gas stream entering the amine process, thereby reducing the makeup water requirements.

A similar configuration may be utilized for a second or acid gas swing adsorption system. For the second swing adsorption system, a wet acid gas stream is utilized as the feed stream for an adsorption step in this swing adsorption system, while a portion of a dry overall facility feed stream, is utilized in the regeneration step as a purge stream in the second swing adsorption system. As the feed stream (e.g., wet acid gas stream) moves through the respective adsorbent beds in the second swing adsorption system, moisture is removed from this stream and a dry acid gas stream exits the adsorbent beds on the product side. In the regeneration step, the moisture is removed from the adsorbent bed and is conducted away by the purge stream (e.g., dry overall facility feed stream), which in turn results a wet purge product that is passed to the amine system. This process thus serves as another pre-saturation step for the other portion of the gas stream entering the amine process, thereby reducing the makeup water requirements. Beneficially, the use of the swing adsorption systems for dehydration reduces or eliminates the heating needs associated with TEG and/or molecular sieve dehydration systems. Furthermore, the configurations utilizing the swing adsorption systems may be smaller, lighter, and therefore less expensive as compared with conventional TEG or molecular sieve units.

Figure 4:
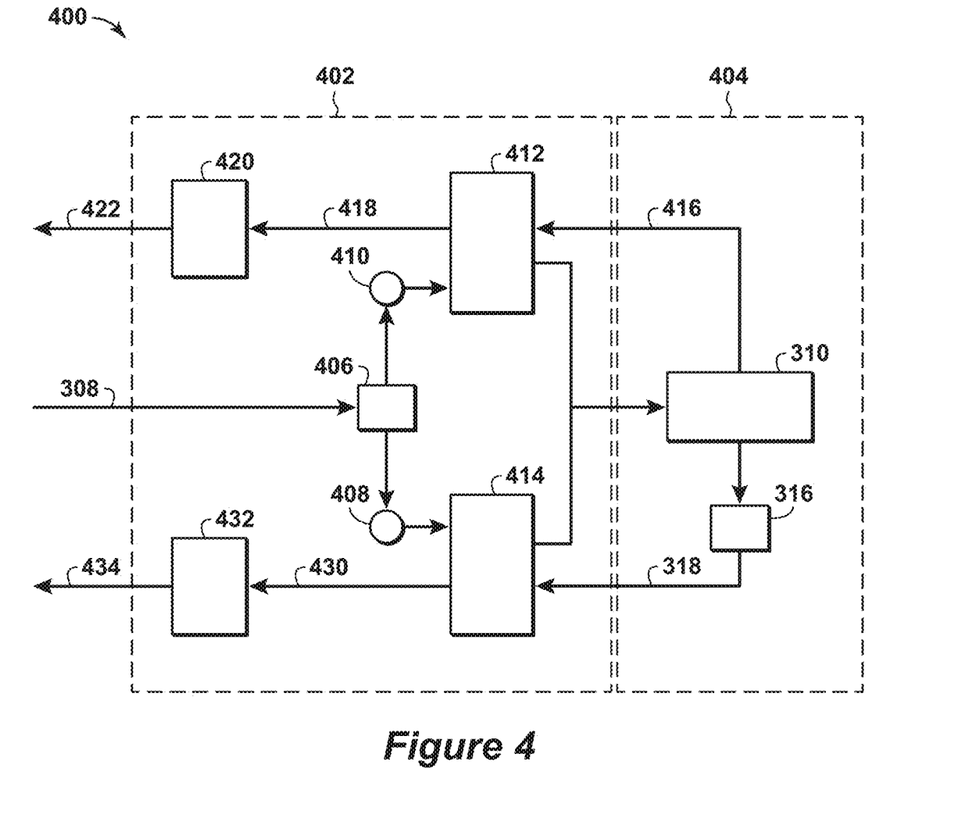
FIG. 4 is an exemplary diagram of the swing adsorption system for removing contaminants from a feed stream to form a dry hydrocarbon rich stream and a dry acid gas stream in accordance with an embodiment of the present techniques.

As an example of these enhancements, FIG. 4 is an exemplary diagram 400 of the swing adsorption system for removing contaminants from a feed stream to form a dry hydrocarbon rich stream and a dry acid gas stream in accordance with an embodiment of the present techniques. This diagram 400 includes a swing adsorption system 402 coupled to a solvent based gas treating system, which for exemplary purposes is an amine system 404.

In the configuration, the swing adsorption system 402 may include a hydrocarbon swing adsorption system 412 and an acid gas swing adsorption system 414. Each of the swing adsorption systems 412 and 414 may include one or more adsorbent bed units, such as the adsorbent beds units discussed in FIGS. 1 and 2, to perform the dehydration for the respective streams. The process may involve performing rapid cycle swing adsorption, which involves using a dry overall facility feed stream as the purge stream for the adsorbent bed units. Also, by integrating the swing adsorption system for dehydration with the amine system, various enhancements are provided by such a configuration, which are utilized to lessen costs associated with the process. Further, as the quantity of adsorbents varies proportionally and linearly with the cycle time, the present techniques provide adsorbent bed units and components that involve a smaller footprint as compared to conventional systems, such as the configuration noted in FIG. 3. In addition, energy may be conserved by not using fired heaters to provide a high temperature purge gas as compared to the operations with the conventional molecular sieve process.

In the swing adsorption system 402, each of the adsorbent bed units are utilized to perform an adsorption step (e.g., a feed step) and a regeneration step in processing the input stream into a wet stream as part of the cycle. The process begins with an input feed stream passing through the conduit 308 to a splitter unit 406 that is configured to pass a portion of the input feed stream in conduit 308 to the respective swing adsorption systems 412 and 414 during a purge step. From the splitter unit 406, a first portion of the input feed stream is passed to a heater unit 410 and then to one or more of the adsorbent bed units in the hydrocarbon swing adsorption system 412, while a second portion of the input feed stream is passed to a heater unit 408 and then to one or more of the adsorbent bed units in the hydrocarbon swing adsorption system 414. The purge product stream is passed from the hydrocarbon swing adsorption system 412 and the acid gas swing adsorption system 414. The combined purge product streams are passed to the amine unit 310 in the amine system 404.

In the amine system 404, the combined purge product streams are separated into a hydrocarbon rich stream and an acid gas stream. The hydrocarbon rich stream may be passed via conduit 416 to the hydrocarbon swing adsorption system 412 for the adsorption step in these units. Also, the acid gas stream may be passed to the compression unit 316 configured to compress the saturated or wet acid gas stream. The compressed acid gas stream is passed via conduit 318 to the acid gas swing adsorption system 414 for the adsorption step in these absorbent bed units.

From the amine system 404, the different streams are used as the feed stream in the respective swing adsorption systems 412 and 414 in the adsorption step. The wet hydrocarbon rich stream is passed through the hydrocarbon swing adsorption system 412 to remove moisture, which is adsorbed into the adsorbent material. The dry hydrocarbon rich stream is passed from the hydrocarbon swing adsorption system 412 via conduit 418 to a pipeline compression unit 420. The pipeline compression unit 420 is configured to increase the pressure of the dry hydrocarbon rich stream to a pipeline pressure. The compressed dry hydrocarbon rich stream is passed via conduit 422 to a storage vessel or a pipeline. Similarly, the wet acid gas stream is passed through the acid gas swing adsorption system 414 to remove moisture, which is adsorbed into the adsorbent material. The dry acid gas stream is passed from the acid gas swing adsorption system 414 via conduit 430 to an injection unit 432. The injection unit 432 may be configured to increase the pressure of the dry acid gas stream to an injection pressure (e.g., as an injection compressor or compression unit) and/or may be configured to increase the density of the dry acid gas stream (e.g., an injection condenser). The compressed dry acid gas stream is passed via conduit 434 to a storage vessel or injection equipment.

By way of example, for the acid gas swing adsorption system, the process for each of the adsorbent bed units in the acid gas swing adsorption system 414 may include a feed step at a feed pressure, which may be about 37 bar, a re-pressurization step to increase the pressure to a re-pressurization pressure, which may be about 40 bar, a purge step and a depressurization step. With a purge stream available at 3 ppmv of moisture, a dry product stream (to injection) containing 0.8 ppmv may be achieved. The molar ratio of purge to feed stream is 1.8. The purge stream may also be heated.

Beneficially, this configuration may remove any additional heat exchanger or furnace from the process flow. Further, the enhancements of the present techniques are further illustrated by comparing the two processes. For example, the system may recycle 40 million pounds of water per million standard cubic feet of overall facility feed gas, while the conventional system does not recycle water. In addition, the footprint, weight and size of the configuration under the present techniques may be enhanced as compared to the conventional system.

In various configurations, swing adsorption system 402 and amine system 404 may process the majority of the overall facility feed stream. For example, the overall facility feed stream is passed to the swing adsorption system 402 to remove contaminants from the adsorbent materials, then the purge product is processed in the amine system 404. The output streams from the amine system 404 are passed to the swing adsorption system 402 to remove water from the respective streams, by adsorbing the water into the adsorbent beds. Accordingly, greater than 90 volume % of the acid gas in the purge stream, greater than 95 volume % of the acid gas in the purge stream or greater than 98 volume % of the acid gas in the purge stream is recycled to the swing adsorption system from the amine system in the wet acid gas stream. Similarly, greater than 90 volume % of the hydrocarbons in the feed stream, greater than 95 volume % of the hydrocarbons in the feed stream or greater than 98 volume % of the hydrocarbons in the feed stream is recycled to the swing adsorption system from the amine system in the wet feed stream. Further, greater than 90 volume % of the facility feed stream, greater than 95 volume % of the facility feed stream or greater than 98 volume % of the facility feed stream that is passed to the swing adsorption system and the amine system is outputted from the swing adsorption system and amine system as a dry acid gas stream and a dry hydrocarbon stream.

In one or more embodiments, the material may include an adsorbent material supported on a non-adsorbent support. Non-limiting examples of adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups, which may be used for $CO_2$ removal, may include primary, secondary, tertiary amines and other non protogenic basic groups such as amidines, guanidines and biguanides.

Further, in one or more embodiments, the adsorbent bed unit may include an adsorbent bed that can be used for the separation of a target gas from a gaseous mixture. The adsorbent is usually comprised of an adsorbent material supported on a non-adsorbent support, or contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the points or places at which a feed stream enters the contactor and the point or place at which a product stream leaves the contactor. In the contactor, the adsorbent is incorporated into the wall of the flow channel.

In one or more embodiments, the rapid cycle swing adsorption process in the present techniques is a rapid cycle temperature swing adsorption (RCTSA) and a pressure swing adsorption (RCPSA) or a rapid cycle pressure and temperature swing adsorption process (RCPTSA). For example, the total cycle times are typically less than 600 seconds, less than 300 seconds, preferably less than 200 seconds, more preferably less than 90 seconds, and even more preferably less than 60 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A system for removing contaminants from a gaseous feed stream, the system comprising:
   a swing adsorption system configured to receive a facility feed stream which is a dry gas stream and to pass at least a first portion of the facility feed stream through a first plurality of swing adsorption bed units, wherein each of the first plurality of swing adsorption bed units are configured to perform a first swing adsorption process to remove water from the each of the first plurality of swing adsorption bed units during a purge step and form a first purge product stream having a higher concentration of water relative to the concentration of water from the facility feed stream;
   a solvent based gas treating system in fluid communication with the swing adsorption system and configured to separate one or more contaminants from the first purge product stream to form a wet hydrocarbon rich stream and a wet acid gas stream and to pass the wet hydrocarbon rich stream from the solvent based gas treating system to the swing adsorption system; and
   wherein the swing adsorption system is configured to adsorb the water from the wet hydrocarbon rich stream in the first plurality of swing adsorption bed units to form a first product stream.

2. The system of claim 1, further comprising a splitter unit configured to divide the facility feed stream into the at least a first portion of the facility feed stream.

3. The system of claim 2, wherein the splitter unit is further configured to divide the facility feed stream into a second portion of the facility feed stream and the swing adsorption system further comprises a second plurality of swing adsorption bed units, wherein each of the second plurality of swing adsorption bed units is configured to perform a second swing adsorption process to remove water from the each of the second plurality of swing adsorption bed units by passing the second portion of the facility feed stream through the each of the second plurality of swing adsorption bed units to form a second purge product stream having a higher concentration of water relative to the concentration of water from the facility feed stream.

4. The system of claim 3, wherein the second plurality of swing adsorption bed units is further configured to remove water from the wet acid gas stream in each of the second plurality of swing adsorption bed units by passing the wet acid gas stream through the each of the second plurality of swing adsorption bed units to form a second product stream.

5. The system of claim 4, wherein the swing adsorption system is configured to combine the second purge product stream with the first purge product stream upstream of the solvent based gas treating system.

6. The system of claim 4, wherein the system is configured such that the second product stream comprises predominately acid gas.

7. The system of claim 4, wherein the second product stream is passed to injection equipment.

8. The system of claim 4, wherein the system is configured such that the first product stream comprises predominately hydrocarbons.

9. The system of claim 4, wherein the system is configured such that the second product stream is passed to a pipeline or a storage tank.

10. The system of claim 9, further comprising a compression unit configured to increase the pressure of the first product stream prior to introduction to the pipeline.

11. The system of claim 4, wherein the solvent based gas treating system comprises an amine unit.

12. The system of claim 4, further comprising a first heating unit configured to heat the first portion of the facility feed stream prior to the first plurality of swing adsorption bed units.

13. The system of claim 12, further comprising a second heating unit configured to heat the second portion of the facility feed stream prior to the second plurality of swing adsorption bed units.

14. The system of claim 13, wherein the first heating unit is configured to heat the first portion of the facility feed stream to a temperature of between 40° F. and 450° F. prior to introduction of the first portion of the facility feed stream to the first plurality of swing adsorption bed units; and the second heating unit is configured to heat the second portion of the facility feed stream to a temperature of between 40° F. and 450° F. prior to introduction of the second portion of the facility feed stream to the second plurality of swing adsorption bed units.

15. The system of claim 4, wherein the system is configured to pass the first portion of the facility feed stream through the first plurality of swing adsorption bed units in a countercurrent flow direction relative to the wet hydrocarbon rich stream through the first plurality of swing adsorption bed units.

16. The system of claim 4, wherein the system is configured to pass the second portion of the facility feed stream through the second plurality of swing adsorption bed units in a countercurrent flow direction relative to the wet acid gas stream through the second plurality of swing adsorption bed units.

17. The system of claim 1, wherein the cyclical swing adsorption process is a temperature swing adsorption process.

18. The system of claim 1, wherein the cyclical swing adsorption process is a rapid cycle pressure swing adsorption process.

19. The system of claim 18, wherein the cycle duration of the rapid cycle pressure swing adsorption process is greater than 2 seconds and less than 300 seconds.

* * * * *